(12) United States Patent
Murveit et al.

(10) Patent No.: US 11,772,654 B2
(45) Date of Patent: *Oct. 3, 2023

(54) OCCUPANCY PREDICTION NEURAL NETWORKS

(71) Applicant: Waymo LLC, Mountain View, CA (US)

(72) Inventors: Hyman Murveit, Portola Valley, CA (US); Abhijit Ogale, Sunnyvale, CA (US); Yu-Han Chen, Sunnyvale, CA (US); Alper Ayvaci, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,499

(22) Filed: Jul. 12, 2022

(65) Prior Publication Data

US 2022/0343657 A1     Oct. 27, 2022

Related U.S. Application Data

(63) Continuation of application No. 16/557,246, filed on Aug. 30, 2019, now Pat. No. 11,403,853.

(51) Int. Cl.
*B60W 30/18* (2012.01)
*G06T 7/174* (2017.01)
(Continued)

(52) U.S. Cl.
CPC ....... *B60W 30/18159* (2020.02); *G01S 7/417* (2013.01); *G01S 13/931* (2013.01);
(Continued)

(58) Field of Classification Search
CPC ....... B60W 30/18159; B60W 2420/52; B60W 60/0027; B60W 2420/42; G01S 7/417;
(Continued)

(56) References Cited

U.S. PATENT DOCUMENTS 10,611,371 B2   4/2020  Kusano et al.
10,611,379 B2   4/2020  Olabiyi et al.
(Continued)

FOREIGN PATENT DOCUMENTS

JP   2016177729        10/2016
JP   2016177729 A  *  10/2016  ............. B60Q 9/008
(Continued)

OTHER PUBLICATIONS

Mohajerin et al., "Multi-step prediction of occupancy grid maps with recurrent neural network," arXiv, Jan. 22, 2019, 9 pages.
(Continued)

*Primary Examiner* — Mahendra R Patel
(74) *Attorney, Agent, or Firm* — Fish & Richardson P.C.

(57) ABSTRACT

Methods, systems, and apparatus, including computer programs encoded on a computer storage medium, for generating a future occupancy prediction for a region of an environment. In one aspect, a method comprises: receiving sensor data generated by a sensor system of a vehicle that characterizes an environment in a vicinity of the vehicle as of a current time point, wherein the sensor data comprises a plurality of sensor samples characterizing the environment that were each captured at different time points; processing a network input comprising the sensor data using a neural network to generate an occupancy prediction output for a region of the environment, wherein: the occupancy prediction output characterizes, for one or more future intervals of time after the current time point, a respective likelihood that the region of the environment will be occupied by an agent in the environment during the future interval of time.

20 Claims, 5 Drawing Sheets

(51) Int. Cl.
*G05D 1/00* (2006.01)
*G05D 1/02* (2020.01)
*G01S 13/931* (2020.01)
*G01S 7/41* (2006.01)
*G06V 20/58* (2022.01)
*G06F 18/214* (2023.01)
*G06V 10/25* (2022.01)
*G06V 10/774* (2022.01)
*G06V 10/80* (2022.01)

(52) U.S. Cl.
CPC ......... *G05D 1/0088* (2013.01); *G05D 1/0212* (2013.01); *G05D 1/0231* (2013.01); *G05D 1/0257* (2013.01); *G06F 18/2155* (2023.01); *G06T 7/174* (2017.01); *G06V 10/25* (2022.01); *G06V 10/7753* (2022.01); *G06V 10/811* (2022.01); *G06V 20/58* (2022.01); *G01S 2013/9323* (2020.01); *G05D 2201/0213* (2013.01); *G06T 2207/20084* (2013.01); *G06T 2207/20132* (2013.01)

(58) Field of Classification Search
CPC ......... G01S 13/931; G01S 2013/9323; G05D 1/0088; G05D 1/0212; G05D 1/0231; G05D 1/0257; G05D 2201/0213; G06F 18/2155; G06F 18/256; G06T 7/174; G06T 2207/20084; G06T 2207/20132; G06V 10/25; G06V 10/7753; G06V 10/811; G06V 20/58
USPC ....................................................... 382/104
See application file for complete search history.

(56) References Cited

U.S. PATENT DOCUMENTS

| | | | | |
|---|---|---|---|---|
| 10,990,855 | B2* | 4/2021 | Jia | G06V 20/20 |
| 11,034,348 | B2* | 6/2021 | Ding | G05D 1/0214 |
| 11,126,180 | B1* | 9/2021 | Kobilarov | B60W 30/095 |
| 11,370,423 | B2* | 6/2022 | Casas | G06N 20/00 |
| 11,511,745 | B2* | 11/2022 | Graves | B60W 30/16 |
| 11,537,134 | B1* | 12/2022 | Wiest | G06N 3/0455 |
| 11,625,036 | B2* | 4/2023 | Halder | B60W 60/001 |
| | | | | 701/2 |
| 2008/0167821 | A1* | 7/2008 | Breed | G08G 1/161 |
| | | | | 701/301 |
| 2013/0100286 | A1 | 4/2013 | Lao | |
| 2016/0280134 | A1* | 9/2016 | Miura | G08G 1/04 |
| 2017/0131719 | A1 | 5/2017 | Micks et al. | |
| 2018/0225585 | A1* | 8/2018 | Dong | G06N 3/04 |
| 2019/0129436 | A1* | 5/2019 | Sun | G06N 3/08 |
| 2019/0152490 | A1* | 5/2019 | Lan | G05D 1/0088 |
| 2020/0017124 | A1* | 1/2020 | Camhi | G06N 20/00 |
| 2020/0086859 | A1 | 3/2020 | McGill et al. | |
| 2020/0110416 | A1* | 4/2020 | Hong | G01C 21/3602 |
| 2020/0148215 | A1* | 5/2020 | Mohajerin | G05D 1/0274 |
| 2020/0159225 | A1* | 5/2020 | Zeng | G05D 1/0212 |
| 2020/0159232 | A1 | 5/2020 | Refaat et al. | |
| 2020/0174490 | A1* | 6/2020 | Ogale | G06N 3/084 |
| 2020/0379461 | A1* | 12/2020 | Singh | G06N 3/044 |
| 2021/0064890 | A1* | 3/2021 | Murveit | G01S 7/417 |
| 2021/0133582 | A1* | 5/2021 | Refaat | G06N 3/084 |

FOREIGN PATENT DOCUMENTS

| | | | |
|---|---|---|---|
| KR | 1020180011470 | 2/2018 | |
| WO | WO-2016024318 A1 * | 2/2016 | ........... B60W 30/08 |
| WO | WO 2016/024318 | 5/2017 | |
| WO | WO 2018/132607 | 7/2018 | |
| WO | WO 2019/023628 | 1/2019 | |
| WO | WO-2019023628 A1 * | 1/2019 | ........... B60W 30/10 |

OTHER PUBLICATIONS

PCT International Search Report and Written Opinion in International Appln. No. PCT/US2020/042841, dated Oct. 30, 2020, 11 pages.

Ren et al., "Faster R-CNN: Towards Real-Time Object Detection with Region Proposal Networks," Neural Information Processing Systems, 2015, 9 pages.

Office Action in Japanese Appln. No. 2022-510922, dated Apr. 17, 2023, 10 pages (with English translation).

Extended Search Report in European Appln. No. 20856700.8, dated Jun. 16, 2023, 8 pages.

Hoermann et al., "Dynamic Occupancy Grid Prediction for Urban Autonomous Driving: A Deep Learning Approach with Fully Automatic Labeling," 2018 IEEE International Conference On Robotics and Automation (ICRA), May 2018, pp. 2056-2063.

Jeon et al., "Traffic Scene Prediction via Deep Learning: Introduction of Multi-Channel Occupancy Grid Map as a Scene Representation," 2018 IEEE Intelligent Vehicles Symposium (IV), Jun. 26, 2018, pp. 1496-1501.

* cited by examiner

OCCUPANCY PREDICTION NEURAL NETWORKS

CROSS REFERENCE TO RELATED APPLICATION

This patent application is a continuation (and claims the benefit of priority under 35 USC 120) of U.S. patent application Ser. No. 16/557,246, filed Aug. 30, 2019. The disclosure of the prior application is considered part of (and is incorporated by reference in) the disclosure of this application.

BACKGROUND

This specification relates to autonomous vehicles.

Autonomous vehicles include self-driving cars, boats, and aircraft. Autonomous vehicles use a variety of on-board sensors to generate sensor data characterizing their environment, and process the sensor data using computer systems to make control and navigation decisions.

Autonomous vehicles can make control and navigation decisions using machine learning models. Machine learning models receive an input and generate an output based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes how an on-board system of a vehicle can predict whether a region of its environment (e.g., a portion of an intersection) will be occupied by an agent in the environment (e.g., another vehicle) in a future interval of time (e.g., the next T seconds after the current time point, e.g., between times T1 and T2 after the current time point).

According to a first aspect there is provided a method including receiving sensor data generated by a sensor system of a vehicle that characterizes an environment in a vicinity of the vehicle as of a current time point. The sensor data includes a set of sensor samples characterizing the environment that were each captured at different time points. A network input including the sensor data is processed using a neural network to generate an occupancy prediction output for a region of the environment. The occupancy prediction output characterizes, for one or more future intervals of time after the current time point, a respective likelihood that the region of the environment will be occupied by an agent in the environment during the future interval of time. The network input is provided to an input layer of the neural network, and the occupancy prediction output for the region of the environment is output by an output layer of the neural network. The occupancy prediction output is provided to a planning system of the vehicle to generate planning decisions that plan a future trajectory of the vehicle.

In some implementations, the sensor samples include images generated by one or more camera sensors of the vehicle.

In some implementations, the sensor samples include point cloud data generated by one or more lidar sensors of the vehicle, sensor data generated by one or more radar sensors of the vehicle, or both.

In some implementations, the future intervals of time after the current time point include an interval of time starting from the current time point.

In some implementations, for each of a set of given future intervals of time after the current time point, the occupancy prediction output characterizes a respective likelihood that the region of the environment will be occupied by an agent in the environment during the given future interval of time.

In some implementations, for each of a set of given regions of the environment, the occupancy prediction output characterizes respective likelihoods that the given region of the environment will be occupied by an agent in the environment during each future interval of time after the current time point.

In some implementations, the region of the environment is an intersection of a roadway.

In some implementations, the method further includes generating, by the planning system, planning decisions that cause the vehicle to cross the intersection of the roadway based on the occupancy prediction output for the intersection of the roadway.

In some implementations, the region of the environment is a portion of a roadway that is occupied by a stationary agent.

In some implementations, the method further includes generating, by the planning system, planning decisions that cause the vehicle to decelerate based on the occupancy prediction output for the portion of the roadway that is occupied by the stationary agent.

In some implementations, the neural network is a convolutional neural network that includes a set of convolutional neural network layers.

In some implementations, processing the sensor data using the neural network to generate the occupancy prediction output for the region of the environment includes: processing a first subset of the sensor data using a first set of one or more neural network layers to generate a first intermediate output; processing a second subset of the sensor data using a second set of one or more neural network layers to generate a second intermediate output; and processing the first intermediate output and the second intermediate output using a third set of one or more neural network layers to generate the occupancy prediction output.

In some implementations, the first subset of the sensor data includes sensor data of a first modality, and the second subset of the sensor data includes sensor data of a second, different modality.

In some implementations, the neural network generates the occupancy prediction output without explicitly localizing current or future positions of other agents in the environment in the vicinity of the vehicle.

In some implementations, the network input further includes road graph data characterizing static features of the environment in the vicinity of the vehicle.

In some implementations, the sensor data includes images captured at respective time points, and the method further includes applying one or more predefined cropping operations to each image prior to processing the images using the neural network.

In some implementations, the sensor data comprises images captured at respective time points; the neural network includes a cropping sub-network that is configured to process the images to generate data specifying an image cropping operation; and processing the sensor data using the neural network includes applying the image cropping operation specified by the cropping sub-network to the images.

According to a second aspect there is provided a system including one or more computers and one or more storage devices communicatively coupled to the one or more computers, where the one or more storage devices store instructions that, when executed by the one or more computers, cause the one or more computers to perform the operations of the method of the first aspect.

According to a third aspect, there are provided one or more non-transitory computer storage media storing instructions that when executed by one or more computers cause the one or more computers to perform the operations of the method of the first aspect.

Particular embodiments of the subject matter described in this specification can be implemented so as to realize one or more of the following advantages.

The occupancy prediction neural network described in this specification can process sensor data (e.g., camera data, radar data, lidar data, or some combination of these) and road graph data to directly predict whether a target region of the environment will be occupied by an agent in a future time interval. In contrast, a conventional occupancy prediction system may predict whether a target region of the environment will be occupied by an agent in a future time interval by performing the intermediate steps of localizing and tracking each agent in the environment. The conventional system may use the localization and tracking data to determine the current position and velocity of each other agent, and then use this data to predict if and when the other agents will occupy the target region in the future. However, localizing and tracking an agent may be challenging and error prone, particularly when the agent is beyond the effective range of the surveying sensors (e.g., lidar and radar sensors, or other sensors that provide 3-D spatial localization data) of the vehicle. The error and uncertainty inherent in localizing and tracking an agent may propagate through the computations performed by the conventional occupancy prediction system and result in the future occupancy prediction for the target region being inaccurate. Therefore, by processing the sensor data to directly predict the future occupancy of the target region without explicitly localizing and tracking each agent in the environment, the occupancy prediction neural network described in this specification may generate more accurate occupancy prediction outputs than some conventional occupancy prediction systems. A planning system that plans the future trajectory of a vehicle can use the occupancy prediction outputs generated by the occupancy prediction neural network to select actions that cause the vehicle to operate more efficiently, safely, and comfortably. As will be described in more detail below, the occupancy prediction neural network described in this specification may be complementary to a conventional occupancy prediction system, and a planning system of a vehicle may use both in planning the future trajectory of the vehicle.

The occupancy prediction neural network described in this specification may consume fewer computational resources than some conventional occupancy prediction systems. For example, in a conventional occupancy prediction system that localizes and tracks each agent in the environment, the volume of computations performed by the system may increase at least linearly with the number of agents in the environment. In contrast, the occupancy prediction neural network described in this specification generates an occupancy prediction output by processing sensor data using one forward pass, independently of the number of other agents in the environment. That is, while a conventional occupancy prediction system may make a separate prediction for whether each agent in the environment will occupy a target region in a future time interval, the occupancy prediction neural network may directly predict whether any agent will occupy the target region in the future time interval.

The occupancy prediction neural network described in this specification can be trained on training data that is automatically generated from logged sensor data without the need for manual labeling. In contrast, training a conventional occupancy prediction system that performs agent localization and tracking may require a substantial amount of manually labeled training data, e.g., where a person manually annotates bounding boxes around objects in camera data, lidar data, and radar data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an on-board system of a vehicle can predict whether a region of its environment (e.g., a portion of an intersection) will be occupied by an agent in the environment (e.g., a vehicle) in one or more future intervals of time (e.g., during the next T seconds). To predict whether a region of the environment will be occupied by an agent in a future time interval, the on-board system can provide sensor data (e.g., camera images) characterizing the environment at multiple time points (up to the current time point) to an "occupancy prediction" neural network. The occupancy prediction neural network is configured to process the sensor data to generate an occupancy prediction output that predicts whether the region of the environment will be occupied by an agent in the future time interval.

The on-board system of the vehicle can use the occupancy prediction output to plan and execute actions that control the vehicle. Take, as an example, the vehicle 102 in the environment 100 depicted in FIG. 1. In this example, the on-board system of the vehicle 102 is planning actions that will enable the vehicle 102 to safely enter the intersection 104 and merge with oncoming traffic (e.g., the vehicles 106, 108 and 110) by traversing the target region 112. The on-board system of the vehicle 102 can process a sequence of camera images depicting the oncoming traffic that are captured by a camera system of the vehicle 102 using the occupancy prediction neural network to predict whether the target region 112 will be occupied within the next several seconds. In response to determining that the target region will be clear of other agents for the next several seconds, the on-board system of the vehicle 102 can execute actions that cause the vehicle 102 to safely enter the intersection and merge with the oncoming traffic.

Using an occupancy prediction neural network can enable the on-board system of a vehicle to effectively predict whether a target region will be occupied in a future time interval without explicitly localizing and tracking the other agents in the environment. Localizing an agent refers to determining the spatial location of the agent in the environment, and tracking the agent refers to repeatedly localizing the agent over multiple time steps, e.g., to estimate the speed of the agent. Localizing an agent may be challenging, particularly if the agent is beyond the limited range of the surveying sensors (e.g., lidar or radar sensors) of the vehicle. The occupancy prediction neural network can effectively predict future occupancy of target regions even in the presence of agents beyond the range of the surveying sensors of the vehicle by learning to implicitly exploit a variety of cues present in the sensor data. For example, the occupancy prediction neural network may learn to implicitly characterize the speed and proximity of other agents based on the rate at which they appear to enlarge (or shrink) in images generated over multiple time steps by the camera sensor of the vehicle.

These features and other features are described in more detail below.

Figure 1:
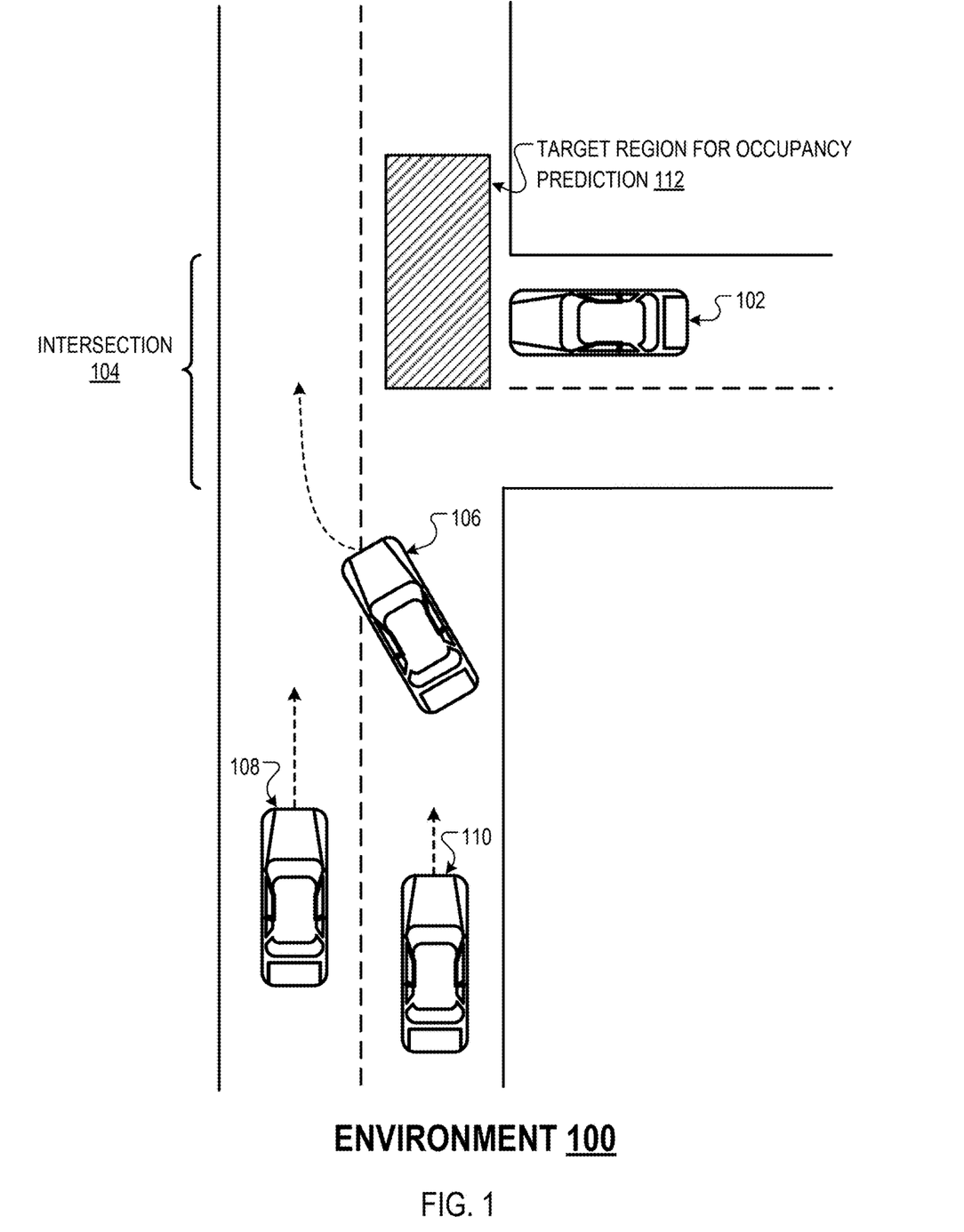
FIG. 1 shows an example environment where the on-board system of a vehicle uses an occupancy prediction neural network to plan the future trajectory of the vehicle.
Figure 2:
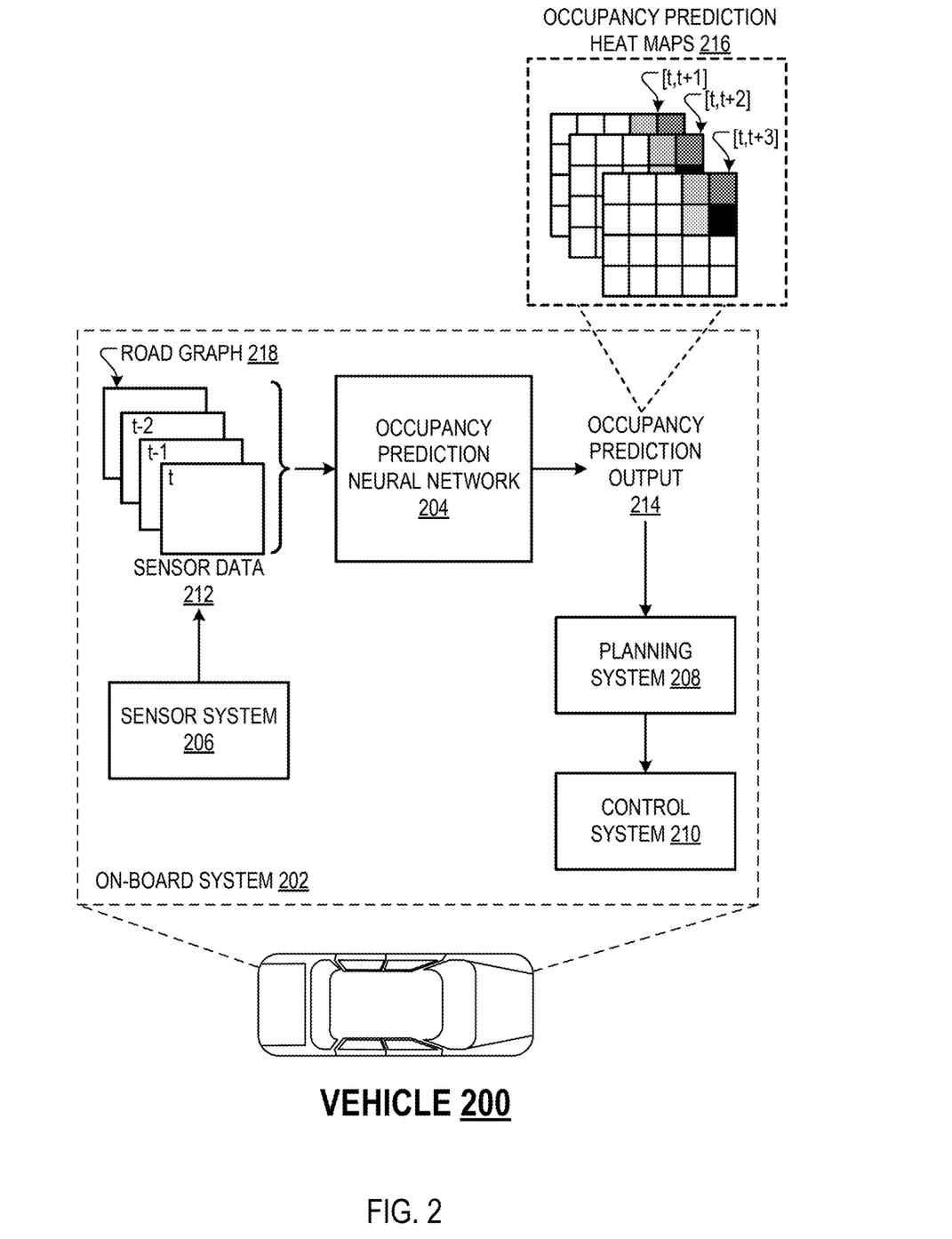
FIG. 2 is a block diagram of an example on-board system of a vehicle that uses an occupancy prediction neural network.

FIG. 2 is a block diagram of an example on-board system 202 of a vehicle 200 that uses an occupancy prediction neural network 204 as part of generating planning decisions that plan the future trajectory of the vehicle 200. The on-board system 202 is composed of hardware and software components, some or all of which are physically located on-board the vehicle 200. Although the vehicle 200 in FIG. 1 is depicted as an automobile, and the examples in this specification are described with reference to automobiles, the occupancy prediction neural network can be used in any of a variety of other settings. For example, a robotic agent that is navigating a warehouse or a manufacturing environment may also use the occupancy prediction neural network as part of generating planning decisions.

The on-board system 202 includes a sensor system 206, the occupancy prediction neural network 204, a planning system 208, and a control system 210, which will each be described in more detail next.

The sensor system 206 enables the on-board system 202 to "see" the environment in the vicinity of the vehicle 200. More specifically, the sensor system 206 uses one or more sensors, e.g., camera sensors, lidar sensors, and radar sensors, to continually (i.e., at each of multiple time points) generate sensor data 212 that characterizes the environment in the vicinity of the vehicle. For example, the sensor system 206 may use a surveying sensor (e.g., a lidar or radar sensor) to generate point clouds characterizing the geometry of the environment. A point cloud refers to a collection of data points which each represent the position of a respective point on a surface in the environment (e.g., a point on the surface of a car, pedestrian, road sign, or building). Each data point may be represented, e.g., by x-y-z coordinates in a standardized coordinate frame, e.g., a coordinate frame centered on the vehicle 200. As another example, the sensor system 206 may use a camera sensor to generate images (e.g., red-green-blue (RGB) images) characterizing the visual appearance of the environment. As used throughout this specification, a sensor sample that is referred to as being captured at a "time point" may be captured over a duration of time, e.g., a sensor sample generated by a lidar sensor may consist of data captured during one revolution of the lidar sensor over a 100 ms duration of time. In this example, the time point at which the lidar sensor sample was captured may be considered to be, e.g., the final time point of the revolution of the lidar sensor.

The occupancy prediction neural network 204 is configured to process: (i) sensor data 212 generated at a sequence of multiple time points, and (ii) road graph data 218 to generate an occupancy prediction output 214 for a target region of the environment. In the example illustrated in FIG. 2, the current time point is t, and the sensor data 212 is generated at the time points t (i.e., the current time point), t-1 (e.g., one second previous to the current time point), and t-2 (e.g., two seconds previous to the current time point). The road graph data 218 characterizes the environment in the vicinity of the vehicle, e.g., the positions and types of various static features of the environment, e.g., lanes, road signs, crosswalks, traffic lights, and the like. The road graph data 218 can be represented in any of a variety of ways, e.g., as 2-D image representing a top down view of the environment in the vicinity of the vehicle. In addition to sensor data 212 and road graph data 218, the occupancy prediction neural network may additionally process other inputs, e.g., that specify the states of traffic lights in the environment (e.g., red, yellow, or green), or that specify the intended future trajectory of the vehicle 200 (i.e., which may influence the behavior of other agents). The occupancy prediction output 214 characterizes the likelihood that the target region of the environment will be occupied by an agent in a future interval of time after the current time point, e.g., a future interval of time starting from the current time point. More generally, the occupancy prediction output 214 may characterize the respective likelihoods that one or more target regions of the environment will be occupied by an agent during each of one or more future intervals of time after the current time point, as will be described in more detail next.

In some implementations, the occupancy prediction output 214 may characterize a respective likelihood that each of multiple target regions of the environment will be occupied by an agent in the future interval of time. For example, the target regions of the environment may be regions having a predefined size (e.g., 10 feet by 10 feet) that are arranged in a predefined grid centered on the current location of the vehicle 200. The heat maps 216 illustrates an example of an occupancy prediction output 214. Each of the heat maps 216 is represented by a grid of cells, where each cell corresponds to a respective region of the environment (the grid itself may be centered on the location of the vehicle). The shade of each cell represents the likelihood that the region of the environment corresponding to the cell will be occupied by an agent in a future interval of time, e.g., the intervals of time [t,t+1], [t,t+2], and [t,t+3], e.g., where a darker shade corresponds to a higher likelihood that the region be occupied in the future interval of time. The example heat maps 216 depict the grid of cells in a Cartesian coordinate system, but more generally, the cells may be represented in any appropriate coordinate system, e.g., a polar coordinate system.

Optionally, rather than the target regions of the environment being predefined, the occupancy prediction neural network 204 may be configured to process an additional input that specifies the target region to be characterized by the occupancy prediction output. For example, the occupancy prediction neural network 204 may be configured to process a mask image (i.e., in addition to the sensor data 212) that specifies the target region of the environment. The mask image may be represented as a two-dimensional array of numerical values, where each component of the array corresponds to a respective portion of the environment. Components of the mask image corresponding to the target region may have a first value (e.g., the value 1), while the other components of the mask image may have a different value (e.g., the value 0). The on-board system 202 may dynamically select the target region of the environment based on the current state of the vehicle in the environment. For example, before causing the vehicle 200 to enter a given lane, the on-board system 202 may select a target region corresponding to the given lane, e.g., by providing an input to the occupancy prediction neural network 204 that includes a mask image specifying the given lane.

Optionally, the occupancy prediction output 214 may characterize the likelihood of each target region being occupied during each of multiple future time intervals. In one example, the set of future time intervals may be consecutive, non-overlapping future time intervals starting from the current time point, e.g., the future time intervals may be given by:

$$\{[t_0+(n-1)\cdot i, t_0+n\cdot i]\}_{n=1}^{N} \quad (1)$$

where $t_0$ is the current time point, i is the fixed duration of each future time interval, and N is the total number of future time intervals. In another example, the set of future time intervals may be future time intervals of different durations that each start from the current time point. Referring to the example depicted in FIG. 2, the occupancy prediction output 214 may specify a respective occupancy prediction heat map 216 corresponding to each future time interval [t,t+1], [t,t+2], [t,t+3], where t is the current time point.

Generally, the occupancy prediction neural network 204 may have any appropriate neural network architecture that enables it to perform its described function. An example occupancy prediction neural network architecture is described in more detail with reference to FIG. 3. Moreover, the occupancy prediction network 204 may be configured to process other inputs in addition to the sensor data samples 212 from previous time points. For example, the occupancy prediction network 204 may additionally process road-graph data defining the static structure of the environment in the vicinity of the vehicle, e.g., the structure of the lanes, and the positions and types of static objects in the environment (e.g., crosswalks, traffic lights, and road signs).

The planning system 208 is configured to process the occupancy prediction output (e.g., in addition to a variety of other data characterizing the current state and predicted future state of the environment) to generate planning decisions that plan the future trajectory of the vehicle 200. In the example described with reference to FIG. 1, in response to receiving an occupancy prediction output specifying that the target region 112 will remain unoccupied for the next ten seconds, the planning system 208 may generate planning decisions that cause the vehicle 200 to traverse the target region. A planning decision may be specified by a sequence of one or more actions, e.g., steering and acceleration actions.

The control system 210 is configured to control some or all of the operations of the vehicle 200 by executing the actions specified by the planning decisions generated by the planning system 208. For example, in response to receiving a planning decision to execute a sequence of steering and acceleration actions, the control system may transmit electronic signals to steering and acceleration control units of the vehicle to cause them to perform the steering and acceleration actions.

Optionally, the on-board system 202 may implement a conventional occupancy prediction system in addition to the occupancy prediction neural network 204. The conventional occupancy prediction system may localize and track each agent to explicitly estimate the current position and velocity of the agent, and then predict if and when the agent will occupy a target region based on its current position and velocity. Occupancy prediction outputs generated by the conventional system may be complementary to the occupancy prediction outputs generated by the occupancy prediction neural network 204. For example, the occupancy prediction neural network 204 may generate more accurate occupancy prediction outputs than the conventional occupancy prediction system when one or more agents in the environment are beyond the effective range of the surveying sensors (e.g., lidar and radar) of the vehicle 200. On the other hand, the conventional occupancy prediction system may generate more accurate occupancy prediction outputs for agents within the effective range of the surveying sensors of the vehicle 200. The planning system 208 may exploit the complementary nature of the occupancy prediction neural network 204 and the conventional occupancy prediction system by using them both to generate planning decisions.

In a variety of situations, the on-board system 202 can use the occupancy prediction neural network 204 to plan a safe and comfortable future trajectory for the vehicle 200 despite being unable to accurately localize certain agents. A few examples follow. .

In one example, the on-board system 202 can use the occupancy prediction network to effectively plan a trajectory that causes the vehicle to turn onto a high-speed road with multiple oncoming agents that are outside the effective range of the surveying sensors of the vehicle (e.g., to make a left-turn across oncoming traffic).

In another example, the on-board system 202 can use the occupancy prediction neural network to effectively plan a trajectory that causes the vehicle to decelerate in advance of a stationary agent on the roadway that is outside the effective range of the surveying sensors of the vehicle. In this example, the stationary agent may be outside the effective range of the surveying sensors due to being a substantial distance away from the vehicle (e.g., 100 meters or more), or because an obstruction (e.g., a hill or a barrier) is partially obstructing the line of sight between the vehicle and the stationary agent.

In another example, an on-board system of a truck (e.g., a semi-trailer truck) may use the occupancy prediction neural network to make long-range occupancy predictions to accommodate the prolonged stopping time of the truck. For example, the on-board system of a truck may use the occupancy prediction neural network to make long-range predictions for whether a lane of the road in advance of the truck is blocked, e.g., due to stationary or slow-moving vehicles, or due to cones indicating road work.

In another example, an on-board system of a vehicle may use the occupancy prediction neural network to generate occupancy prediction output that takes into account sensor data from multiple different viewpoints of the environment, e.g., from camera sensors located on different sides of the vehicle. Using sensor data from multiple viewpoints may enable the on-board system to make accurate occupancy prediction outputs even in situations where, e.g., the surveying sensors of the vehicle (e.g., lidar and radar sensors) can only characterize one viewpoint of the environment at a time.

In some implementations, the occupancy prediction neural network may be configured to generate occupancy prediction outputs that characterize both: (i) whether a target region will be occupied in a future time interval, and (ii) likelihoods that certain types of agents will occupy the target region in the future time interval. The "type" of an agent may be, e.g., vehicle, bicyclist, pedestrian, or any other appropriate type. For each target region and for each future time interval, the occupancy prediction neural network may generate an output that specifies, for each type in a predefined set of agent types, a likelihood that an agent of the type would occupy the target region in the future time interval.

In some cases, the vehicle 200 may be a simulated vehicle navigating a simulated environment in a simulation system, rather than a real-world vehicle navigating a real-world environment. For a simulated vehicle (or in the context of analyzing logged sensor data), a "current" time point may be understood to refer to any time point at which a future occupancy prediction is generated (i.e., that characterizes whether a target region will be occupied in a future time interval after the current time point).

Figure 3:
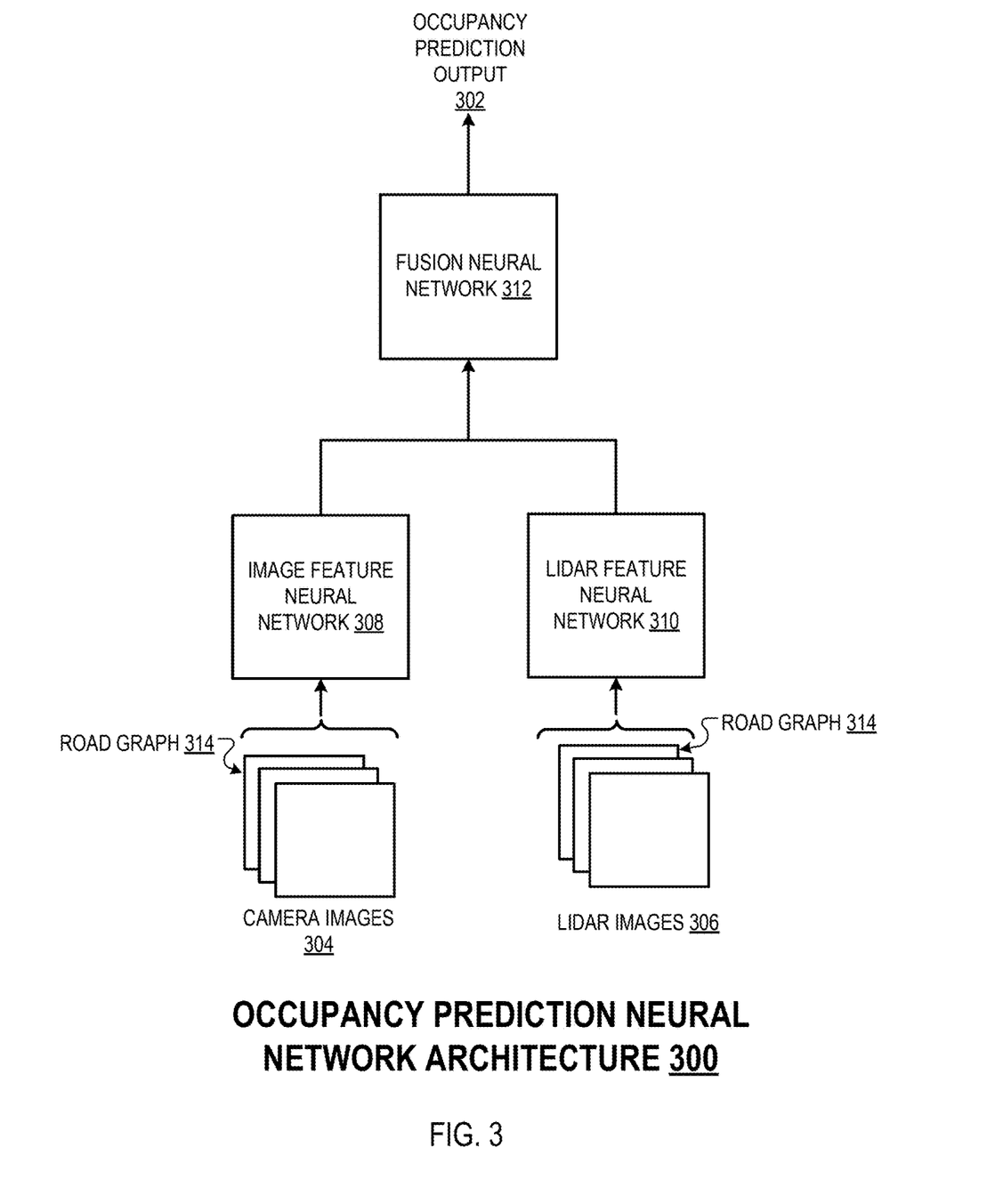
FIG. 3 illustrates an example architecture of an occupancy prediction neural network.

FIG. 3 illustrates an example architecture 300 of an occupancy prediction neural network. The occupancy prediction network is configured to process a set of sensor samples that characterize the environment in the vicinity of a vehicle at each of multiple time points to generate an occupancy prediction output 302, as described with reference to FIG. 2.

In the example architecture 300, the occupancy prediction neural network processes an input including a set of camera images 304, a set of lidar images 306, and a road graph 314. In one example, the occupancy prediction neural network may process 10 camera images 304 which are each captured 0.2 seconds apart, i.e., such that the camera images span a 2 second period of time. Similarly, the occupancy prediction neural network may process 10 lidar images 306 which are each captured 0.2 seconds apart and which span approximately the same 2 second period of time as the camera images 304. A lidar "image" refers to a top-down representation of a lidar point cloud.

The occupancy prediction neural network processes the concatenated set of camera images 304 using an image feature neural network to generate an alternative representation of the camera images 304. Similarly, the occupancy prediction neural network processes the concatenated set of lidar images 306 using a lidar feature neural network to generate an intermediate representation of the lidar images 306. The image feature neural network 308 and the lidar feature neural network 310 may have respective architectures that include, e.g., a sequence of two-dimensional (2D) or three-dimensional (3D) convolutional layers. The alternative representations of the camera images 304 and lidar images 306 may each be represented as an ordered collection of numerical values, e.g., an array of numerical values with two "spatial" dimensions and one or more "channel" dimensions.

The occupancy prediction neural network concatenates the alternative representations of the camera images 304 and the lidar images 306, and processes the concatenated representations using the fusion neural network 312 to generate the occupancy prediction output. The fusion neural network may have an architecture that includes a sequence of convolutional layers followed by an output layer. The occupancy prediction output 302 may be represented, e.g., as a sequence of heat maps which each characterize occupancy likelihoods for a grid of target regions during a respective future time interval, e.g., as described with reference to FIG. 2. In one example, the occupancy prediction neural network may have multiple output layers, where each output layer generates an occupancy prediction output corresponding to a respective future time interval. The output layer corresponding to a given future time interval may be, e.g., a sigmoid output layer with a respective neuron corresponding to each target region of the environment.

The occupancy prediction neural network may further process a representation of a road graph characterizing the environment in the vicinity of the vehicle. For example, the occupancy prediction neural network may concatenate a representation of the road graph to: (i) the camera images 304 and the lidar images 306, or (ii) the alternative representations of the camera images 304 and the lidar images 306.

In some cases, each of the camera images 304 processed by the occupancy prediction neural network may be cropped from another camera image with a larger field of view. For example, each camera image 304 may be a predefined image crop that depicts a region of the environment that is centered a fixed distance (e.g., 50 meters or 150 meters) away from the vehicle. As another example, rather than the camera images 304 being cropped in a predefined manner, the occupancy prediction network may dynamically crop the camera images 304 using a learned attention mechanism, e.g., that is jointly trained with the rest of the occupancy prediction neural network.

The learned attention mechanism may be implemented, e.g., by a "cropping" neural network that processes the camera images 304 to generate data defining a region to be cropped from the camera images, e.g., the vertices of a bounding box in the frame of reference of the camera images 304. In this example, the occupancy prediction neural network may crop the camera images 304 in accordance with the output of the cropping neural network before providing them to the image feature neural network 308. The occupancy prediction neural network can use a similar learned (or predefined) attention mechanism to crop the lidar images 306 before processing them using the lidar feature neural network 310. The cropping neural network can have any appropriate neural network architecture, e.g., a region proposal network architecture described with reference to: S. Ren, K. He, R. Girshick, J. Sun: "Faster R-CNN: Towards Real-Time Object Detection with Region Proposal Networks", Neural Information Processing Systems (NeurIPS) Conference, (2015). Cropping the sensor samples (e.g., camera and lidar images) using an attention mechanism can enable the occupancy prediction neural network to generate more accurate occupancy prediction outputs by focusing on the most relevant portions of the sensor samples.

Various other architectures of the occupancy prediction neural network are possible. For example, the occupancy prediction neural network may have multiple image feature neural networks, each of which are configured to process a different set of camera images. In one example, each image feature neural network may process a set of camera images that depict a region of the environment centered a fixed distance from the vehicle at different time points. In another example, each image feature neural network may process a set of camera images that is captured by a respective camera having a respective orientation, e.g., one image feature neural network may process images captured by a frontfacing camera, and another image feature neural network may process images captured by a side-facing camera.

Figure 4:
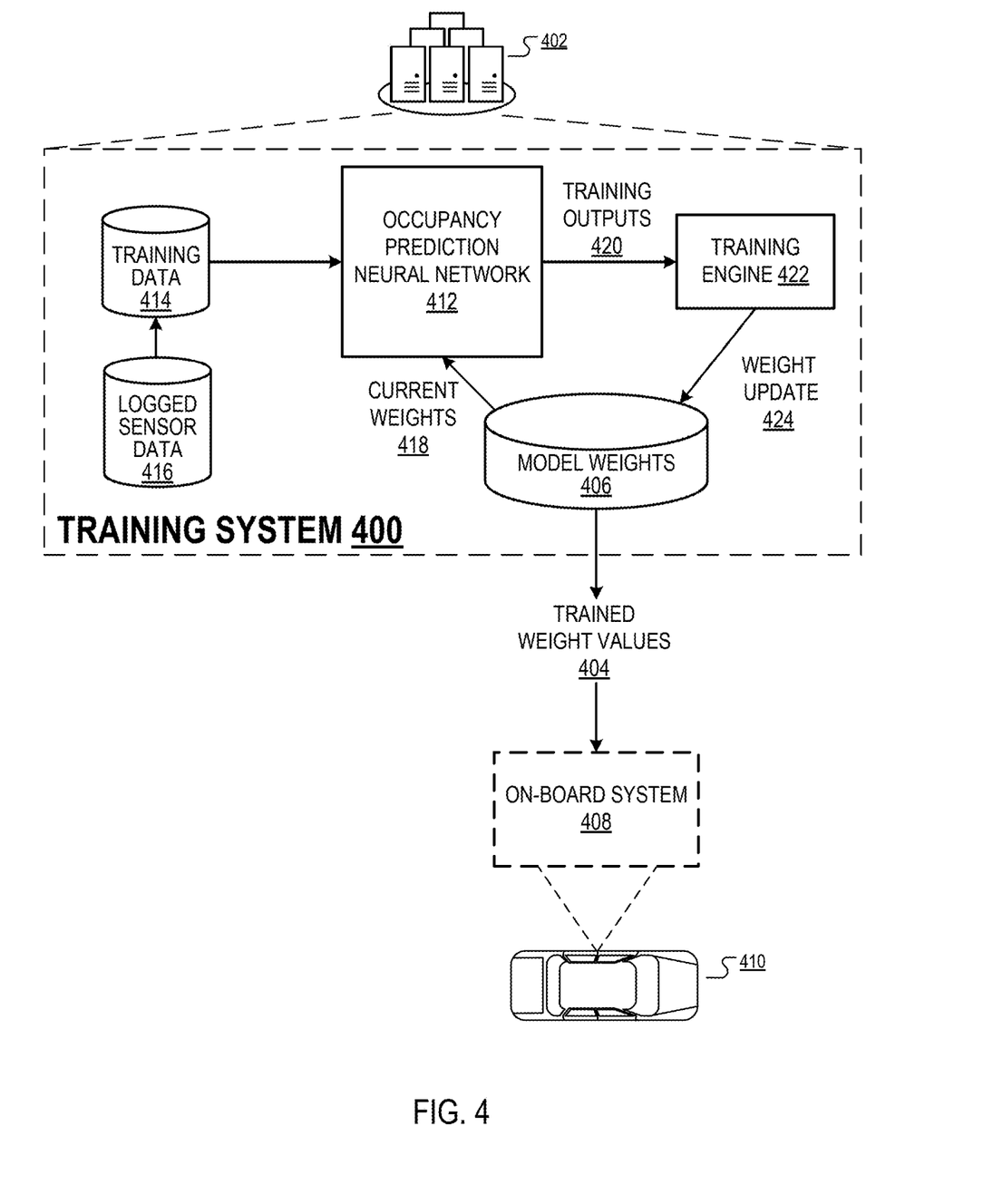
FIG. 4 shows an example training system for training an occupancy prediction neural network.

FIG. 4 shows an example training system 400. The training system 400 is an example of a system implemented as computer programs on one or more computers in one or more locations (e.g., the data center 402) in which the systems, components, and techniques described below are implemented.

The training system 400 is configured to determine trained values 404 for the model weights 406 of an occupancy prediction neural network of an on-board system 408 of a vehicle 410, and then provide the trained weight values 404 to the on-board system, e.g., using a wired or wireless connection. The model weights 406 of the occupancy prediction neural network refer to the trainable parameters of the occupancy prediction neural network, e.g., that define the values of the layer parameters of the neural network layers of the occupancy prediction neural network.

The training system 400 determines the trained weight values 404 by training the occupancy prediction neural network 412 on a set of training data 414. The training data 414 consists of a set of training examples, where each training example includes: (i) a training input including sensor data samples (e.g., camera images and lidar data) captured at different time points, and (ii) a target occupancy output. The target occupancy output represents the output that should be generated by the occupancy prediction neural network 412 by processing the corresponding training input.

The training system 400 can generate the training data 414 in an automated manner by processing a set of logged sensor data 416, i.e., stored sensor data that was previously generated by the sensors of one or more vehicles. To generate a training example, the training system 400 can identify a training input by aggregating sensor data samples (e.g., camera images and lidar data) over a sequence of time steps from the training data. The training system 400 can identify the target occupancy output corresponding to the training input by processing sensor data samples from subsequent time steps to determine whether one or more target regions of the environment were occupied at the subsequent time steps. That is, the training system 400 may generate training examples by processing logged sensor data 416 to reliably associate sensor data measured over a first duration of time with sensor data measured at a subsequent time point (e.g., which characterizes agent occupancy in a target region several seconds later). At the subsequent time point, other agents in the environment may have been closer to the sensors of the vehicle which generated the logged sensor data, and thus the sensor data measured at the subsequent time point may characterize the agents more accurately than sensor data measured during the first duration of time. In this way, the training system 400 can generate the training data 414 with minimal or no human intervention.

The training system 400 can train the occupancy prediction neural network 412 on the training data 414 over multiple training iterations. At each training iteration, the training system 400 may select a "batch" (set) of training examples, and process the training inputs of the training examples in accordance with the current weights 418 of the occupancy prediction neural network 412 to generate corresponding training outputs 420. The training engine 422 may determine an update 424 to the model weights 406 by computing gradients of an objective function that measures the similarity between: (i) the training outputs 420, and (ii) the corresponding target occupancy prediction outputs specified by the training examples. The objective function may be, e.g., a cross-entropy objective function, the training engine 422 may compute the gradients of the objective function using backpropagation techniques, and the training engine 422 may determine the weight update 424 from the gradients using any appropriate gradient descent algorithm, e.g., Adam or RMSprop.

The training system 400 may determine that the training is complete when a training termination criterion is satisfied, e.g., when a predetermined number of training iterations have been performed, or when the value of the objective function satisfies a predetermined threshold. After determining the training is complete, the training system 400 can provide the trained weight values 404 of the occupancy prediction network 412 to the on-board system 408 for use in generating planning decisions that plan the future trajectory of the vehicle 410, as described with reference to FIG. 2.

Figure 5:
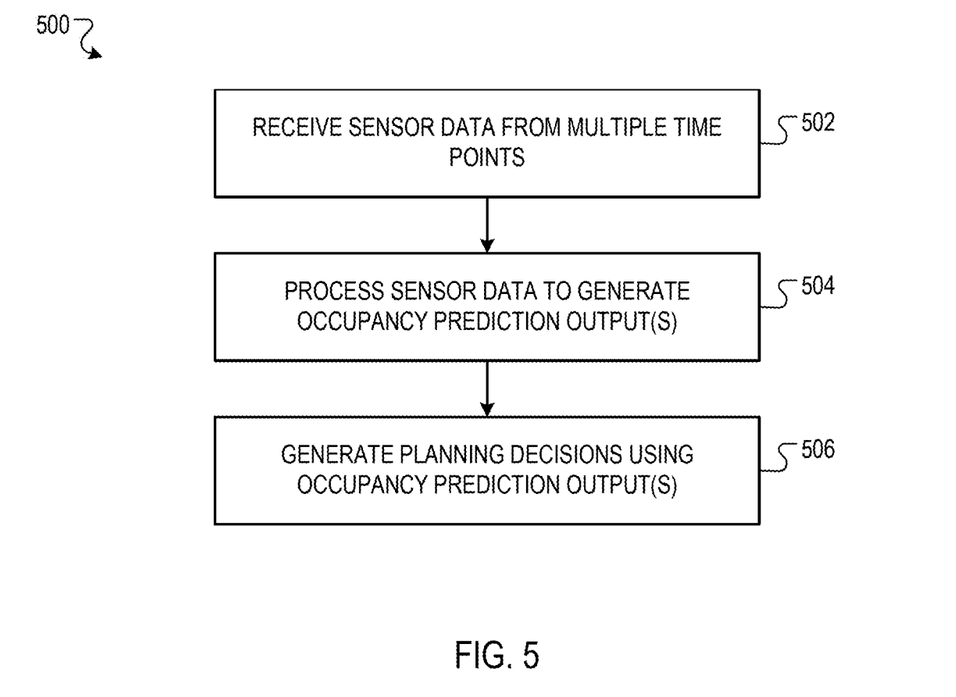
FIG. 5 is a flow diagram of an example process for generating planning decisions that plan the future trajectory of a vehicle using an occupancy prediction neural network.

FIG. 5 is a flow diagram of an example process 500 for generating planning decisions that plan the future trajectory of a vehicle using an occupancy prediction neural network. For convenience, the process 500 will be described as being performed by a system of one or more computers located in one or more locations. For example, an on-board system, e.g., the on-board system 202 of FIG. 2, appropriately programmed in accordance with this specification, can perform the process 500.

The system receives sensor data generated by a sensor system of the vehicle that characterizes the environment in the vicinity of the vehicle as of the current time point (502). The sensor data includes sensor data samples characterizing the environment that were each captured at different time points. A sensor data sample refers to an element of sensor data (e.g., a camera image or a lidar point cloud) that is generated by a sensor of the vehicle at a time point. The sensor data samples may include, e.g., images generated by a camera sensor of the vehicle, point cloud data generated by a lidar or radar sensor of the vehicle, or both.

The system processes a network input including the sensor data using an occupancy prediction neural network to generate one or more occupancy prediction outputs for a region of the environment (504). The network input is provided to an input layer of the neural network, and the occupancy prediction output is output by an output layer of the neural network. An "input layer" of a neural network refers to a neural network layer that receives an external input (i.e., from outside the neural network rather than from another neural network layer) and provides the external input to one or more other layers of the neural network. The occupancy prediction output characterizes, for one or more future intervals of time after the current time point, the respective likelihood that the region of the environment will be occupied by an agent in the environment during the future interval of time after the current time point. The future intervals of time may be include an interval of time starting from the current time point. In some cases, the occupancy prediction output may characterize a respective likelihood that the region of the environment will be occupied by an agent in each of multiple future intervals of time after the current time point. In some cases, for each future interval of time, the occupancy prediction output characterizes the respective likelihood that each of multiple regions of the environment will be occupied by an agent in the future interval of time. The network input may include additional data, e.g., road graph data.

In some cases, the system may apply predefined cropping operations to the sensor data images prior to processing them using the occupancy prediction neural network. In some cases, the occupancy prediction neural network may include a cropping sub-network that is configured to process images included in the network input to generate data specifying an image cropping operation. The occupancy prediction neural network may apply the cropping operation to the images as part of generating the occupancy prediction output.

The occupancy prediction neural network may have a neural network architecture that includes multiple convolutional neural network layers. In one example, to generate the occupancy prediction output, the occupancy prediction neural network may process a first subset of the sensor data having a first modality (e.g., camera images) using a first set of one or more neural network layers to generate a first intermediate output. The occupancy prediction neural network may process a second subset of the sensor data having a second modality (e.g., lidar images) using a second set of one or more neural network layers to generate a second intermediate output. The occupancy prediction neural network may then generate the occupancy prediction output by processing the first intermediate output and the second intermediate output using a third set of one or more neural network layers, e.g., as described in more detail with reference to FIG. 3. Generally, the occupancy prediction neural network generates the occupancy prediction output without explicitly localizing the positions of other agents in the environment.

The system provides the occupancy prediction output to a planning system of the vehicle to generate planning decisions that plan the future trajectory of the vehicle (506). A planning decision may specify a sequence of one or more actions (e.g., steering or acceleration actions) to be performed by the vehicle. In one example, the vehicle may be near an intersection of a roadway, and the planning system may process the occupancy prediction output for the intersection to generate planning decisions that cause the vehicle to cross the intersection. In another example, one of the agents in the vicinity of the vehicle may be stationary on a roadway, and the planning system may process the occupancy prediction output for the portion of the environment occupied by the stationary agent to generate planning decisions that cause the vehicle to decelerate.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method implemented by one or more data processing apparatus, the method comprising:
receiving sensor data generated by a sensor system of a vehicle that characterizes an environment in a vicinity of the vehicle as of a current time point, wherein the sensor data comprises a plurality of sensor samples characterizing the environment that were each captured at different time points;
generating a network input to a neural network from at least the sensor data;
processing the network input using the neural network to generate an occupancy prediction output for a region of the environment, wherein:
the occupancy prediction output characterizes, for one or more future intervals of time after the current time point, a respective likelihood that the region of the environment will be occupied by an agent in the environment during the future interval of time; and providing the occupancy prediction output to a planning system of the vehicle to generate planning decisions that plan a future trajectory of the vehicle.

2. The method of claim 1, wherein the sensor samples comprise images generated by one or more camera sensors of the vehicle.

3. The method of claim 1, wherein the sensor samples comprise point cloud data generated by one or more lidar sensors of the vehicle, sensor data generated by one or more radar sensors of the vehicle, or both.

4. The method of claim 1, wherein the future intervals of time after the current time point comprise an interval of time starting from the current time point.

5. The method of claim 1, wherein for each of a plurality of given future intervals of time after the current time point, the occupancy prediction output characterizes a respective likelihood that the region of the environment will be occupied by an agent in the environment during the given future interval of time.

6. The method of claim 1, wherein for each of a plurality of given regions of the environment, the occupancy prediction output characterizes respective likelihoods that the given region of the environment will be occupied by an agent in the environment during each future interval of time after the current time point.

7. The method of claim 1, wherein the region of the environment is an intersection of a roadway.

8. The method of claim 7, further comprising generating, by the planning system, planning decisions that cause the vehicle to cross the intersection of the roadway based on the occupancy prediction output for the intersection of the roadway.

9. The method of claim 1, wherein the region of the environment is a portion of a roadway that is occupied by a stationary agent.

10. The method of claim 9, further comprising generating, by the planning system, planning decisions that cause the vehicle to decelerate based on the occupancy prediction output for the portion of the roadway that is occupied by the stationary agent.

11. The method of claim 1, wherein neural network is a convolutional neural network comprising a plurality of convolutional neural network layers.

12. The method of claim 1, wherein processing the network input using the neural network to generate the occupancy prediction output for the region of the environment comprises:
processing a first subset of the sensor data using a first set of one or more neural network layers to generate a first intermediate output;
processing a second subset of the sensor data using a second set of one or more neural network layers to generate a second intermediate output; and
processing the first intermediate output and the second intermediate output using a third set of one or more neural network layers to generate the occupancy prediction output.

13. The method of claim 12, wherein the first subset of the sensor data comprises sensor data of a first modality, and the second subset of the sensor data comprises sensor data of a second, different modality.

14. The method of claim 1, wherein the neural network generates the occupancy prediction output without explicitly localizing current or future positions of other agents in the environment in the vicinity of the vehicle.

15. The method of claim 1, wherein the network input is generated based on at least road graph data characterizing static features of the environment in the vicinity of the vehicle.

16. The method of claim 1, wherein the sensor data comprises images captured at respective time points, and further comprising:
applying one or more predefined cropping operations to each image prior to generating the network input.

17. The method of claim 1, wherein:
the sensor data comprises images captured at respective time points;
the neural network comprises a cropping sub-network that is configured to process the images to generate data specifying an image cropping operation; and
processing the network input using the neural network comprises applying the image cropping operation specified by the cropping sub-network to the images.

18. A system comprising:
one or more computers; and
one or more storage devices communicatively coupled to the one or more computers, wherein the one or more storage devices store instructions that, when executed by the one or more computers, cause the one or more computers to perform operations comprising:
receiving sensor data generated by a sensor system of a vehicle that characterizes an environment in a vicinity of the vehicle as of a current time point, wherein the sensor data comprises a plurality of sensor samples characterizing the environment that were each captured at different time points;
generating a network input to a neural network from at least the sensor data;
processing the network input using the neural network to generate an occupancy prediction output for a region of the environment, wherein:
the occupancy prediction output characterizes, for one or more future intervals of time after the current time point, a respective likelihood that the region of the environment will be occupied by an agent in the environment during the future interval of time; and
providing the occupancy prediction output to a planning system of the vehicle to generate planning decisions that plan a future trajectory of the vehicle.

19. One or more non-transitory computer storage media storing instructions that when executed by one or more computers cause the one or more computers to perform operations comprising:
receiving sensor data generated by a sensor system of a vehicle that characterizes an environment in a vicinity of the vehicle as of a current time point, wherein the sensor data comprises a plurality of sensor samples characterizing the environment that were each captured at different time points;
generating a network input to a neural network from at least the sensor data;
processing the network input using the neural network to generate an occupancy prediction output for a region of the environment, wherein:
the occupancy prediction output characterizes, for one or more future intervals of time after the current time point, a respective likelihood that the region of the environment will be occupied by an agent in the environment during the future interval of time; and
providing the occupancy prediction output to a planning system of the vehicle to generate planning decisions that plan a future trajectory of the vehicle.

20. The non-transitory computer storage media of claim 19, wherein the sensor samples comprise images generated by one or more camera sensors of the vehicle.

\* \* \* \* \*